Dec. 24, 1935.  W. C. HEDGCOCK  2,025,204
BRAKE ARRANGEMENT
Original Filed July 27, 1931   2 Sheets—Sheet 1
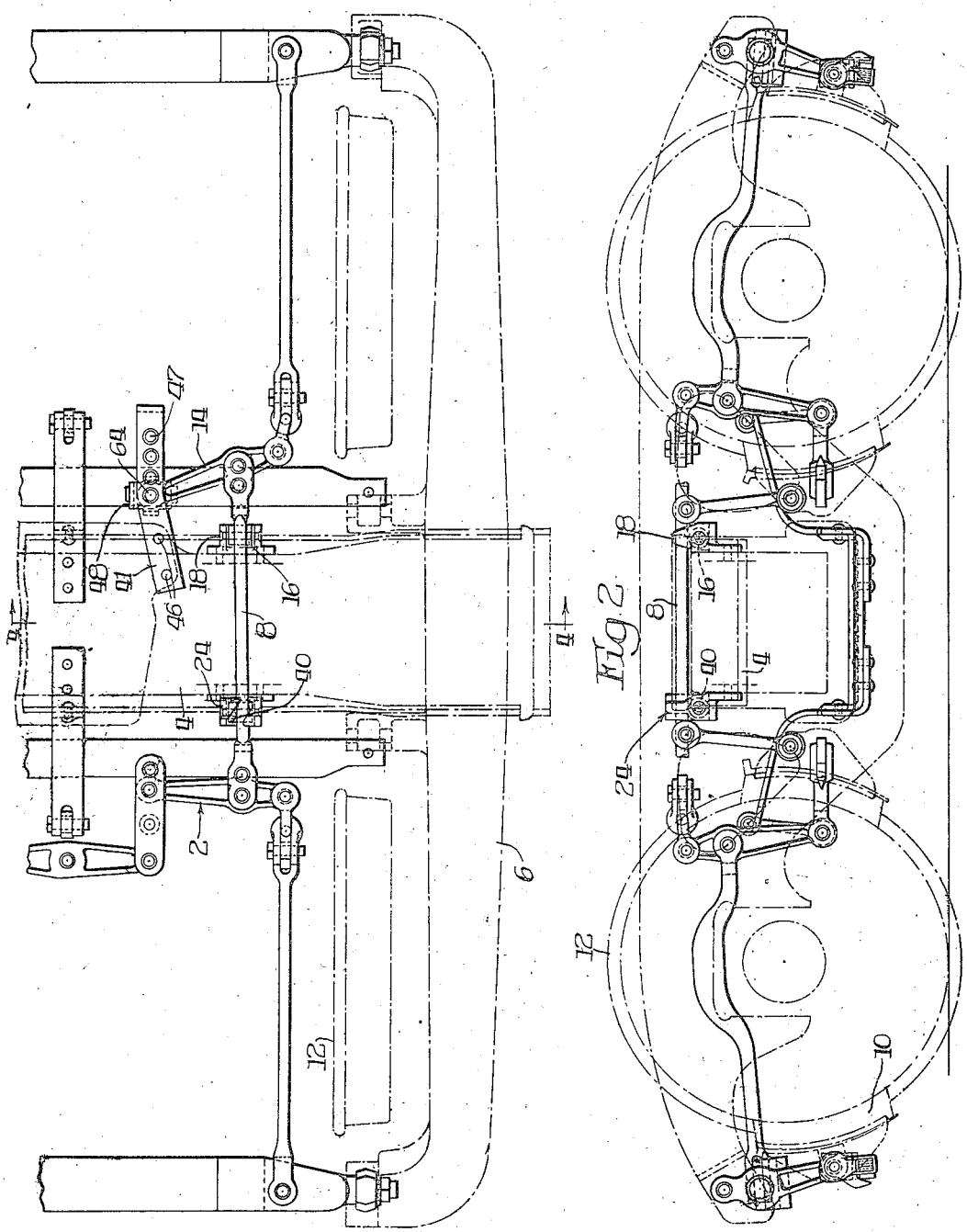
Inventor
William C. Hedgcock.
By Wilkinson, Huxley, Byron & Knight
attys

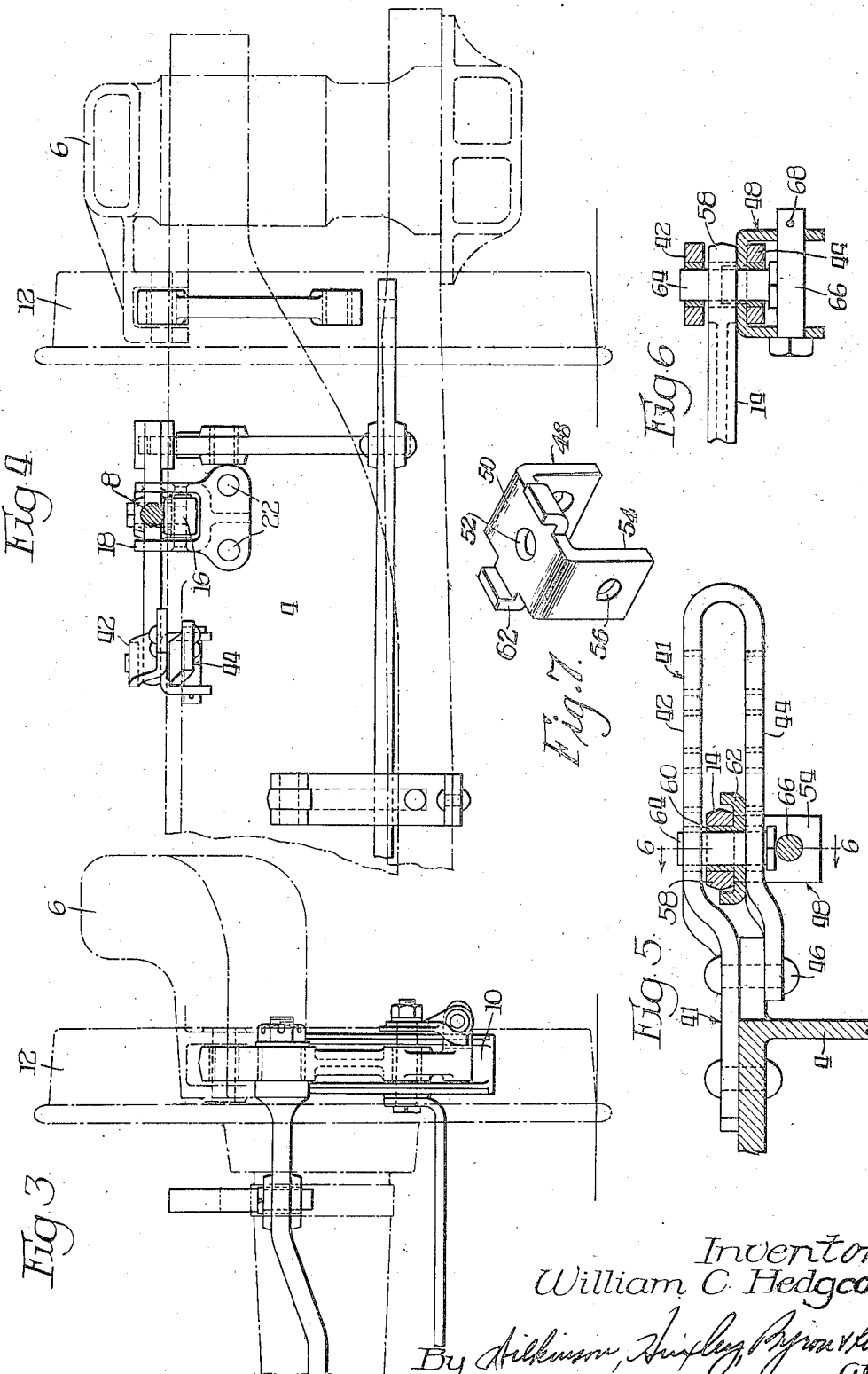

Patented Dec. 24, 1935

2,025,204

UNITED STATES PATENT OFFICE 2,025,204

BRAKE ARRANGEMENT

William C. Hedgcock, Wilmette, Ill., assignor to American Steel Foundries, Chicago, Ill., a corporation of New Jersey Original application July 27, 1931, Serial No. 553,335. Divided and this application March 11, 1932, Serial No. 598,107

29 Claims. (Cl. 188—197)

The present invention relates to brake mechanisms or arrangements, and more in particular to novel means for support of a brake rod thereof and for taking up slack therein.

Among the objects of the present invention is to provide novel means in a brake mechanism for support of a brake rod thereof and to prevent its displacement during operation thereof or the car to which it is attached.

In certain types of railway cars, as for example, open top freight cars wherein the contents are unloaded by overturning the car while clamped in a roll-over dumper, the brake rods of the present brake mechanisms tend to fall out of the open top supports therefor. Under these conditions, these rods, unless returned to their normal operative position upon their supports, cause the brake mechanism to become partially or totally inoperative.

It is therefore an object of the present invention to provide novel means for supporting and retaining a brake rod in operative position, whereby the same operates in association with the remaining brake mechanism to effectively transmit braking movements to the brake shoes, such means including structure adapted to retain the rod when the same is in a plane other than in the plane of operation thereof and to effectively restore the same upon such supporting means after the same has been moved into its operative position.

In an illustrative embodiment of the invention, such supporting means comprising a bracket provided with upstanding walls preventing lateral displacement of the rod, these walls having inturned flanges terminating in spaced relation to provide a slot or opening diagonally disposed relative to the axis of the bracket and rod in operative position. The rod is adapted to be received in the slot or opening and moved into its operative position, at which time the flanges of the support overhang the rod to prevent upward displacement thereof. In the embodiment selected to illustrate the invention, this type of bracket is shown in combination with an open top bracket for support of the brake rod, although it is understood any other bracket of suitable construction may be used in combination therewith.

The invention further contemplates the idea of providing a novel slack adjuster in the present brake mechanism for use in conditions where clearance above same is restrictive, whereby the pin or other means for pivotally connecting the brake lever or other member thereto, may be moved or inserted into its operative position from the under side of the adjuster, means being included and in association with the adjuster for supporting and retaining the pin or other pivot means and for guiding the brake lever during adjustment thereof in the adjuster.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary diagrammatic top plan view of a truck assembly disclosing a brake mechanism including embodiments of the present invention associated therewith;

Figure 2 is a view in side elevation of the car truck assembly of Figure 1 of the drawings and the brake mechanism of the present invention;

Figure 3 is an enlarged fragmentary end view in elevation of one side of the truck shown in Figures 1 and 2 of the drawings;

Figure 4 is a vertical cross-sectional view taken in a plane represented by line 4—4 of Figure 1 of the drawings;

Figure 5 is an enlarged detached view in side elevation of the brake adjuster of the present brake mechanism, disclosing the same as being attached to a transverse bolster of the truck assembly;

Figure 6 is a fragmentary vertical cross-sectional view taken in a plane represented by line 6—6 of Figure 5 of the drawings;

Figure 7 is a detached view in perspective of the carrier for the brake adjuster of the present invention.

This case is a division of application Serial No. 553,335, filed July 27, 1931.

Referring now more in detail to the drawings, embodiments of the present invention are shown in connection with brake mechanism, generally referred to as 2, associated with a transverse bolster 4 spanning between side frames 6 of a car truck assembly diagrammatically shown in dotted lines in the drawings, this brake mechanism being provided with a brake rod 8, operatively moved through various brake levers by a brake cylinder (not disclosed) for causing the brake shoes 10 to move into contacting relation with the tread of the car wheels 12.

In the embodiment disclosed, the brake rod 8 is supported upon the bolster 4 adjacent one end thereof by an open bracket 16 and adjacent the other end thereof by a bracket 24 having a diagonally disposed slot formed between overhanging flanges for holding this rod in its operative position, as set forth and claimed in the Hedgcock application Serial No. 553,335, filed July 27, 1931. The brake rod 8 has an end connected to a brake lever 14 which in turn is associated with a novel slack adjuster made in accordance with the present invention.

An embodiment selected for illustrating this novel brake adjuster is disclosed as comprising a bracket 41 comprising upper and lower straps 42 and 44 secured as by means of the rivets 46, to the transverse bolster 4, these straps being provided with a series of aligned openings 47. Mounted upon the lower strap 44 is a carrier 48 comprising a central bearing portion 50 having an opening 52 centrally located therein, and downwardly depending wall portions 54 provided with aligned openings 56, these wall portions 54 being adapted to straddle the lower strap 44 and extend downwardly therebelow.

The brake lever 14 is provided with a hub 58 having an opening 60 therethrough, this hub 58 being adapted to be inserted between the upper and lower straps 42 and 44 of the bracket of the adjuster and into supporting relation with the central bearing portion 50 of the carrier. This central portion 50 of the carrier is provided with outwardly and upwardly extending flanges 62 adapted for engagement with the hub 58 upon selective movement of the lever within the adjuster bracket 41.

The brake lever 14 is pivotally mounted in the bracket 41 by means of a headed pin 64 adapted to be inserted from bneath the bracket 41 through any selected set of aligned openings 47 thereof and openings 52 and 60 of the carrier 48 and hub 58, respectively, registering therewith. The pin 64 is held in its operative position by means of a headed pin 66 mounted in the openings 56 of the depending wall portions 54, this pin 66 being adapted to engage the head of the pin 64 and is locked in this position by means of a cotter pin 68.

When it is desired to adjust the brake lever 14 within the bracket 41, the pin 64 may be removed and the lever 14 moved upon the carrier 48, the hub 58 thereof engaging with the flanges 62 of the carrier for simultaneous movement of the same into any selected position, whereby the opening 52 thereof is in alignment with the openings 47 of the bracket 41. The pin 64 may then be reinserted through the aligned openings and the pin 66 inserted through the openings 56 for holding the pin 64 in its new position. It will be readily appreciated that the pin 64 is readily inserted from beneath the bracket 41 and is amply supported by the pin 66.

It is to be understood that I do not wish to be limited by the axact embodiment of the device shown, which is merely by way of illustration and not limitation, as various and other forms of the device will of course be apparent to those skilled in the art without departing from the spirit of the invention or the scope of the claims.

I claim:

1. A slack adjuster for brake mechanism provided with a brake lever, comprising a bracket provided with a plurality of pairs of openings, means selectively insertable in pairs of said openings from beneath said bracket for adjustably and pivotally connecting said brake lever, and means for engaging said insertable means and for support thereof.

2. A slack adjuster for a brake mechanism provided with a brake lever, comprising a bracket, a vertically disposed pin for pivotally connecting said lever to said bracket, and means for engaging the lower end of said pin for supporting the same in position.

3. A slack adjuster for a brake mechanism provided with a brake lever, comprising a bracket, a movable carriage on said bracket, a pin for pivotally connecting said lever and bracket, and means on said carriage for supporting said pin.

4. In a brake mechanism, the combination of a slack adjuster bracket, a brake lever supported thereon, a pin for pivotally connecting said lever and bracket, and means extending beneath said pin for support thereof and to prevent displacement of the same.

5. In a brake mechanism, the combination of a slack adjuster bracket, a carriage supported on said bracket, a brake lever pivotally connected to said braket, a pin for said pivotal connection, and means associated with said carriage for support of said pin.

6. In a brake mechanism, the combination of a slack adjuster bracket, a brake lever supported thereon, a pin for pivotally connecting said lever and bracket, walls depending from said bracket, and means carried by said walls for support of said pin.

7. In a brake mechanism, the combination of a slack adjuster bracket having an upper and a lower strap portion provided with aligned openings, a brake lever supported between said straps, a pin engaging said aligned openings of said bracket and lever for pivotally connecting the same, walls depending from said lower strap, and means supported by said walls engaging with said pin to prevent displacement thereof.

8. In a brake mechanism, the combination of a slack adjuster bracket having an upper and a lower strap portion provided with aligned openings, a carriage having downwardly extending walls on said lower strap, a brake lever supported on said carriage, a pin engaging in aligned openings of said bracket, carriage and lever for pivotally connecting said lever to said bracket, and means mounted in the walls of said carriage engaging with said pin to prevent displacement thereof.

9. In a brake mechanism, the combination of a slack adjuster bracket having an upper and a lower strap portion provided with aligned openings, a carriage having downwardly extending walls and upwardly extending flanges supported on said lower strap, a brake lever on said carriage and between said flanges, a pin engaging in aligned openings of said bracket, carriage and lever for pivotally connecting said lever and bracket, and a pin mounted in said walls engaging said pin to prevent displacement thereof.

10. In a brake mechanism, the combination of a slack adjuster bracket having an upper and a lower strap portion provided with aligned openings, a U-shaped carriage supported on said lower strap and having downwardly depending walls straddling the same, said carriage being further provided with upstanding flanges, a brake lever supported between said flanges and adapted for engagement therewith for movement of said carriage when said lever is adjusted in said bracket, a pin engaging in aligned openings of said bracket, carriage and lever for pivotally connecting said lever and bracket, and a pin mounted in said walls engaging said pin to prevent displacement thereof.

11. In a brake mechanism, the combination of a slack adjuster bracket having an upper and a lower strap portion provided with aligned openings, a carriage supported on said bracket, said carriage being formed to provide a central supporting portion and downwardly extending walls adapted to straddle said lower strap, said central portion being provided with upstanding flanges, a brake lever on said carriage and between said flanges, a pin engaging in aligned openings of said bracket, carriage and lever for pivotally connecting said lever and bracket, and a pin mounted in said walls engaging said pin to prevent displacement thereof.

12. In a brake mechanism, the combination of a slack adjuster bracket having an upper and a lower strap portion provided with aligned openings, a carriage supported on said bracket, said carriage being formed to provide a central supporting portion provided with an opening and integral walls extending downwardly therefrom and adapted to straddle said lower strap, said walls being provided with aligned openings, integral flange portions extending laterally and upwardly of said central portion, a brake lever supported between said flanges and adapted for engagement therewith for movement of said carriage when said lever is adjusted in said bracket, said lever having an opening adapted to register with the openings in said central portion and straps, a pin insertable through said aligned openings for pivotally connecting said lever and bracket, and a pin mounted in the openings of said walls for engagement of said pin and to prevent its displacement.

13. A slack adjuster for a brake mechanism provided with a brake lever, comprising a bracket, a carriage associated with said bracket, and single means for connecting an end of said lever to said carriage and bracket.

14. A slack adjuster for a brake mechanism provided with a brake lever, comprising a bracket, a member between an end of said lever and bracket, and single means for securing said lever and member to said bracket and at selected positions along said bracket.

15. A slack adjuster for a brake mechanism provided with a brake lever, comprising a bracket, a member between an end of said lever and bracket, means for securing said lever and member at selected positions along said bracket, and removable means carried by said member for locking said securing means in any of its positions.

16. A slack adjuster for a brake mechanism provided with a brake lever, comprising a bracket, a carriage member associated with said lever and bracket, and single means for securing said lever and member to said bracket and at selected positions along said bracket.

17. A slack adjuster for a brake mechanism provided with a brake lever, comprising a bracket, a carriage member associated with said lever and bracket, means for securing said lever and member at selected positions along said bracket, and removable means associated with said member for locking said securing means in any of its positions.

18. A slack adjuster for a brake mechanism provided with a brake lever, comprising a bracket having a series of spaced openings, a member associated with said lever and movable relative to said bracket, a pin insertable in any selected opening and an aligned opening of said lever, and means associated with said member for locking said pin in any of its various positions.

19. A slack adjuster for a brake mechanism provided with a brake lever, comprising a bracket for support of an end of said lever, a securing member for connecting said lever to said bracket, said member being adapted to be positioned from beneath said bracket, and means for locking said member to prevent downward movement of the same.

20. A slack adjuster for a brake mechanism provided with a brake lever, comprising a bracket for support of an end of said lever, a headed securing pin having its shank insertable in aligned openings in said bracket and lever and from beneath said bracket, and means disposed beneath said head for holding said pin in position.

21. A slack adjuster for a brake mechanism provided with a brake lever, comprising a bracket for support of an end of said lever, a member associated with said lever and movable relative to said bracket, a securing member for connecting said lever to said bracket at a selected position, said member being adapted to be positioned from beneath said bracket, and means associated with said movable member for locking said securing member to prevent downward movement of the same.

22. A slack adjuster for a brake mechanism provided with a brake lever provided with an opening, comprising a bracket having a series of spaced openings and adapted to support an end of said lever, a carriage member having an opening associated with said lever and movable relative to said bracket, a headed securing pin having its shank insertable through any selected opening in said bracket and aligned openings in said lever and carriage member from beneath said bracket, and means associated with said carriage member for locking said pin to prevent downward movement of the same.

23. A slack adjuster for a brake mechanism provided with a brake lever provided with an opening, comprising a bracket having a series of spaced openings and adapted to support an end of said lever, a carriage member having an opening associated with said lever and movable relative to said bracket, said member having spaced flanges, a headed securing pin having its shank insertable through any selected opening in said bracket and aligned openings in said lever and carriage member from beneath said bracket, and a removable pin member supported by said spaced flanges for locking said first-named pin to prevent downward movement of the same.

24. In brake mechanism, the combination of a dead lever, a support for said lever, said support being provided with spaced apertures, a carrier supported on said support, said dead lever being disposed on said carrier, means securing said dead lever to said carrier and support and selectively engageable in said apertures to take up slack in said brake mechanism.

25. In brake mechanism, the combination of a dead lever, a support for said lever, said support being provided with spaced apertures, a carrier supported on said support, said dead lever being disposed on said carrier, means securing said dead lever to said carrier and support and selectively engageable in said apertures to take up slack in said brake mechanism, and means on said carriage for locking said first named means in assembled relation to said support, carrier and lever.

26. In brake mechanism, the combination of a dead lever, a support for said lever, a carrier supported on said support, said dead lever being disposed on said carrier, and single means securing said dead lever to said carrier and support in selected positions on said support to take up slack in said brake mechanism.

27. In brake mechanism, the combination of a dead lever, a support for said lever, a carrier supported on said support, said dead lever being disposed on said carrier, means securing said dead lever to said carrier and support in selected positions on said bracket to take up slack in said brake mechanism, and means on said carriage for locking said first named means in assembled relation to said support, carrier and lever.

28. In brake mechanism, the combination of a dead lever, a support for said lever, said support being provided with spaced apertures, a carrier supported on said support, said dead lever being disposed on said carrier, means securing said dead lever to said carrier and support and selectively engageable in said apertures to take up slack in said brake mechanism, and means for locking said first named means in assembled relation to said support, carrier and lever.

29. In brake mechanism, the combination of a dead lever, a support for said lever, a carrier supported on said support, said dead lever being disposed on said carrier, means securing said dead lever to said carrier and support and selectively engaging said support to take up slack in said brake mechanism, and means for locking said first named means in assembled relation to said support, carrier and lever.

WILLIAM C. HEDGCOCK.